(12) United States Patent
Sakamoto

(10) Patent No.: US 6,456,572 B1
(45) Date of Patent: Sep. 24, 2002

(54) DISK DRIVING UNIT

(75) Inventor: Kazuo Sakamoto, Kanagawa (JP)

(73) Assignee: Nippon Columbia Co., Ltd., Tokyo (JP)

( * ) Notice: Subject to any disclaimer, the term of this patent is extended or adjusted under 35 U.S.C. 154(b) by 0 days.

(21) Appl. No.: 09/407,851

(22) Filed: Sep. 29, 1999

(30) Foreign Application Priority Data

Jan. 12, 1998 (JP) ............................................. 10-342029

(51) Int. Cl.$^7$ ................................................ G11B 17/28
(52) U.S. Cl. .................................................. 369/30.56
(58) Field of Search .................... 360/97.03, 98.01, 360/98.02, 98.03, 98.04, 99.01, 99.02, 91, 92; 211/41.12; 369/30.33, 30.43, 30.55, 30, 85, 30.51, 30.56, 30.57, 30.62, 30.79, 30.86

(56) References Cited

U.S. PATENT DOCUMENTS

| | | | |
|---|---|---|---|
| 4,815,057 A | | 3/1989 | Miller et al. |
| 5,027,335 A | | 6/1991 | Deis |
| 5,060,090 A | * | 10/1991 | Kobayashi et al. ........... 360/71 |
| 5,442,500 A | * | 8/1995 | Hidona et al. ................ 360/22 |
| 5,504,723 A | * | 4/1996 | Ross ............................ 369/37 |
| 5,577,010 A | * | 11/1996 | Haque ......................... 369/36 |
| 5,615,184 A | * | 3/1997 | Tsuruta et al. ................ 369/37 |
| 5,640,288 A | * | 6/1997 | Horie ....................... 360/98.04 |
| 5,659,434 A | * | 8/1997 | Yamakawa et al. ........... 360/69 |
| 5,682,276 A | | 10/1997 | Hinnen et al. |
| 5,936,796 A | * | 8/1999 | Haneda ........................ 360/92 |
| 5,943,306 A | * | 8/1999 | Silverstein ................... 369/37 |
| 6,094,322 A | * | 7/2000 | Nakagomi et al. ............ 360/92 |
| 6,144,519 A | * | 11/2000 | Hanaoka et al. .............. 360/92 |

FOREIGN PATENT DOCUMENTS

| | | |
|---|---|---|
| JP | Hei-2-14460 | 1/1990 |
| JP | 5-342740 | 12/1993 |

OTHER PUBLICATIONS

Patent Abstracts of Japan JP04014669 A (Canon Inc), Jan. 20, 1992.

* cited by examiner

Primary Examiner—Brian E. Miller
Assistant Examiner—Tianjie Chen
(74) Attorney, Agent, or Firm—Dickstein Shapiro Morin & Oshinsky LLP

(57) ABSTRACT

A compact disk drive unit capable of changing disks in a very short time. An access mechanism is provided for transferring a disk between a rack and a plurality of disk driving mechanisms, wherein the access mechanism is pivotally supported by a central shaft which is approximately parallel with a central shaft of the rack. A disk transfer means is provided to selectively face the rack and the disk driving mechanisms to transfer a disk between them. The disk driving mechanisms are radially disposed around the central shaft of the access mechanism to face the revolving access mechanism at a preset distance.

6 Claims, 13 Drawing Sheets

REVOLVES 180 DEGREES.

DISK DRIVING UNIT

BACKGROUND OF THE INVENTION

This invention relates to a disk drive unit which automatically changes a plurality of disks to read-access (or access to reproduce) or read/write-access a disk. More particularly, the present invention relates to a disk drive unit equipped with a plurality of disk driving mechanisms.

In Japanese Non-examined Patent Publication No. 5-342740 (1993) as illustrated in FIG. 13, there is disclosed a conventional automatic disk changing equipment (a first conventional equipment) consisting of a rack 52 which revolves on its central shaft 51 with a plurality of disks 50 arranged on it in a ring shape with the central shaft 51 as the center, a plurality of disk transfer mechanisms 53a through 53c each of which transfers and reverses a disk 50, and a plurality of disk driving mechanisms 54a through 54c each of which drives (read-accesses or read/write-accesses) a disk 50, wherein said disk transfer mechanisms 53a through 53c are respectively on the disk driving mechanisms 54a through 54c.

Further, in Japanese Non-examined Patent Publication No. 2-14460 (1990) as illustrated in FIG. 14, there is disclosed a conventional automatic disk changing equipment (a second conventional equipment) consisting of a stationary rack 56 which piles up a plurality of disks 55, a disk transfer mechanism 57 which transfers and reverses a disk 55, and a plurality of disk driving mechanisms 58a and 58b each of which drives a disk 55, wherein said disk driving mechanisms 58a and 58b share the disk transfer mechanism 57.

Said automatic disk changing equipment drives a plurality of disks 50 or 55 simultaneously by said disk driving mechanisms 54a through 54c or 58a and 58b.

In the first conventional automatic disk changing equipment, however, it may rarely happen that two or more disks 50 are transferred at a time. Therefore, it is not recommendable to provide dedicated disk transfer mechanisms 53a through 53c respectively on the disk driving mechanisms 54a through 54c judging from a point of cost and space reduction. Further they occupy some installation spaces, which prevents installation of additional disk driving mechanisms.

In the second conventional automatic disk changing equipment having only one disk transfer mechanism 57 to transfer disks 55 between the stationary rack 56 and the plurality of disk driving mechanisms 58a and 58b, disks must be transferred a long way and consequently, it takes more time to change disks.

SUMMARY OF THE INVENTION

Accordingly, it is an object of the present invention to provide a compact disk drive unit which can change disks over a plurality of disk driving mechanisms without the aforesaid problems of the conventional automatic disk changing equipment.

The disk driving unit in accordance with the present invention comprises a rack which revolves on its central shaft with a plurality of disks arranged on it radially with the central shaft as the center, a plurality of disk driving mechanisms each of which drives (read-accesses or read/write-accesses) a disk, an access mechanism which is located between said rack and said disk driving mechanisms to transfer said disks between thereof, and a control unit. Said access mechanism is pivotally supported by a second central shaft which is approximately in parallel with said first central shaft and equipped with a disk transfer means which can selectively face to said rack and to any of said disk driving mechanisms. Said disk driving mechanisms are disposed radially around said second central shaft to face to the revolving access mechanism at a preset distance.

A feature of the present invention is that said disk transfer means takes in a disk from one side of the means facing to said rack and pushes it out from the identical side into one of said disk drive mechanisms.

Another feature of the present invention is that said disk transfer means takes in a disk from one side of the means facing to said rack and pushes it out from the other side into one of said disk drive mechanisms.

A further feature of the present invention is that said disk driving mechanisms are located around said second central shaft to face said access mechanism and that said access mechanism is built up so that it may take in a disk from one of said disk driving mechanisms and push it out into the opposite disk driving mechanism.

According to the present invention, an access mechanism for transferring a disk between said rack and said disk driving mechanisms is provided so that the access mechanism can revolve on a central shaft which is approximately in parallel with the central shaft of the rack. Further, a disk transfer means is provided to transfer a disk to and from a selected one of said rack and said disk driving mechanisms which is opposite to the disk transfer means. Said disk driving mechanisms are radially disposed around the central shaft of said access mechanism so that they may concentrate to said second central shaft of said access mechanism with a preset distance from thereof.

Said access mechanism takes in a disk from said rack, revolves to select and face to one of said disk driving mechanisms around it, and pushes the disk into the selected disk driving mechanism.

These features of the disk drive unit in accordance with the present invention make the unit smaller and disk changing faster.

DETAILED DESCRIPTION OF THE PREFERRED EMBODIMENTS

Figure 1:
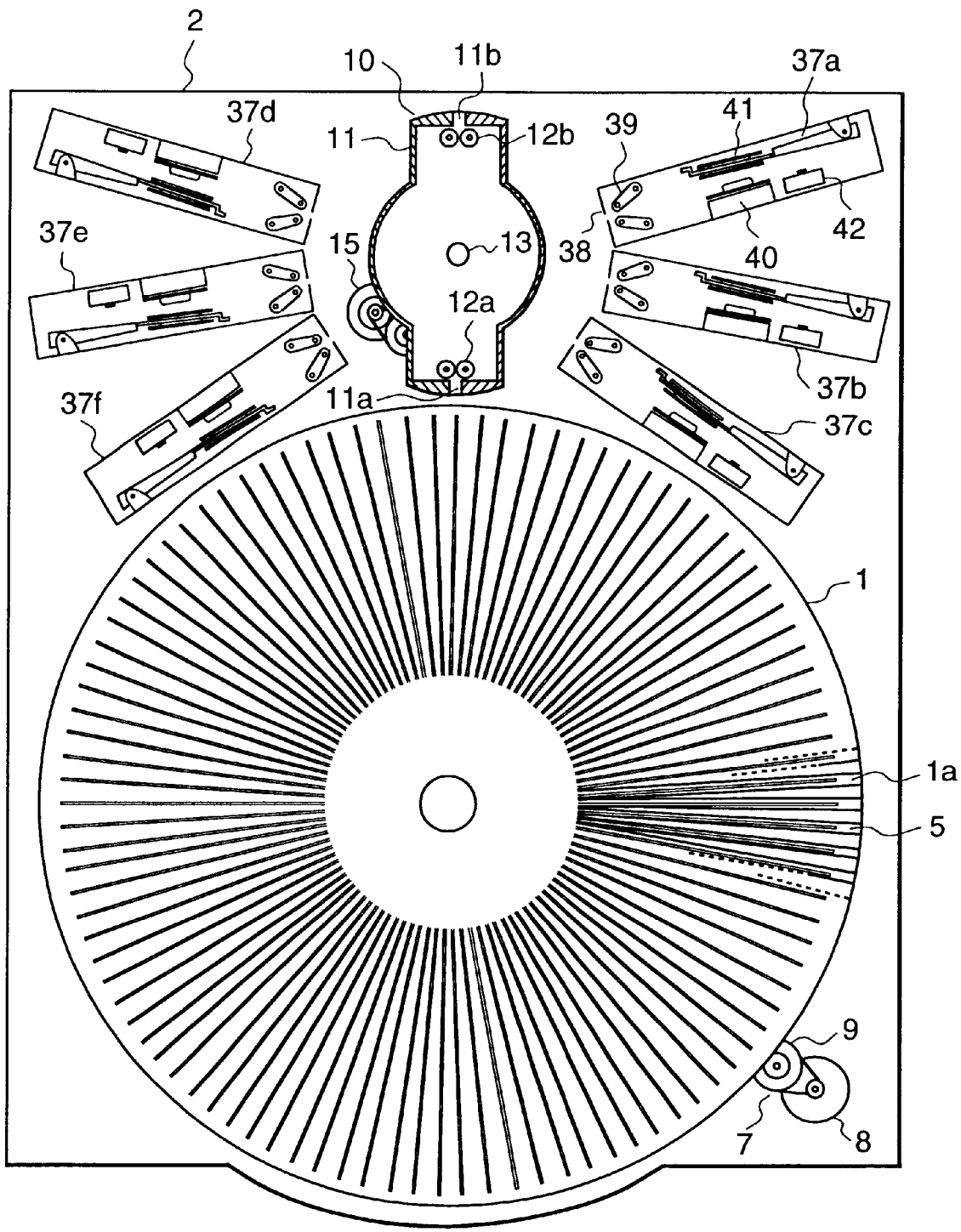
FIG. 1 is a top plan view showing the layout of components of a disk drive unit which is a preferred embodiment of the present invention.

One preferred embodiment of the present invention will be explained below.

Referring to FIG. 1 through FIG. 5, the structure of the disk drive unit of the present invention will be explained. The disk drive unit comprises a rack 1 which can revolve on its central shaft 3 and can have a plurality of disks 5 arranged on it radially around the central shaft, a plurality of disk driving mechanisms 37a through 37f each of which drives (read-accesses or read/write-accesses) a disk, and an access mechanism 10 which is located between said rack and said disk driving mechanisms to transfer said disks between thereof.

Figure 2:
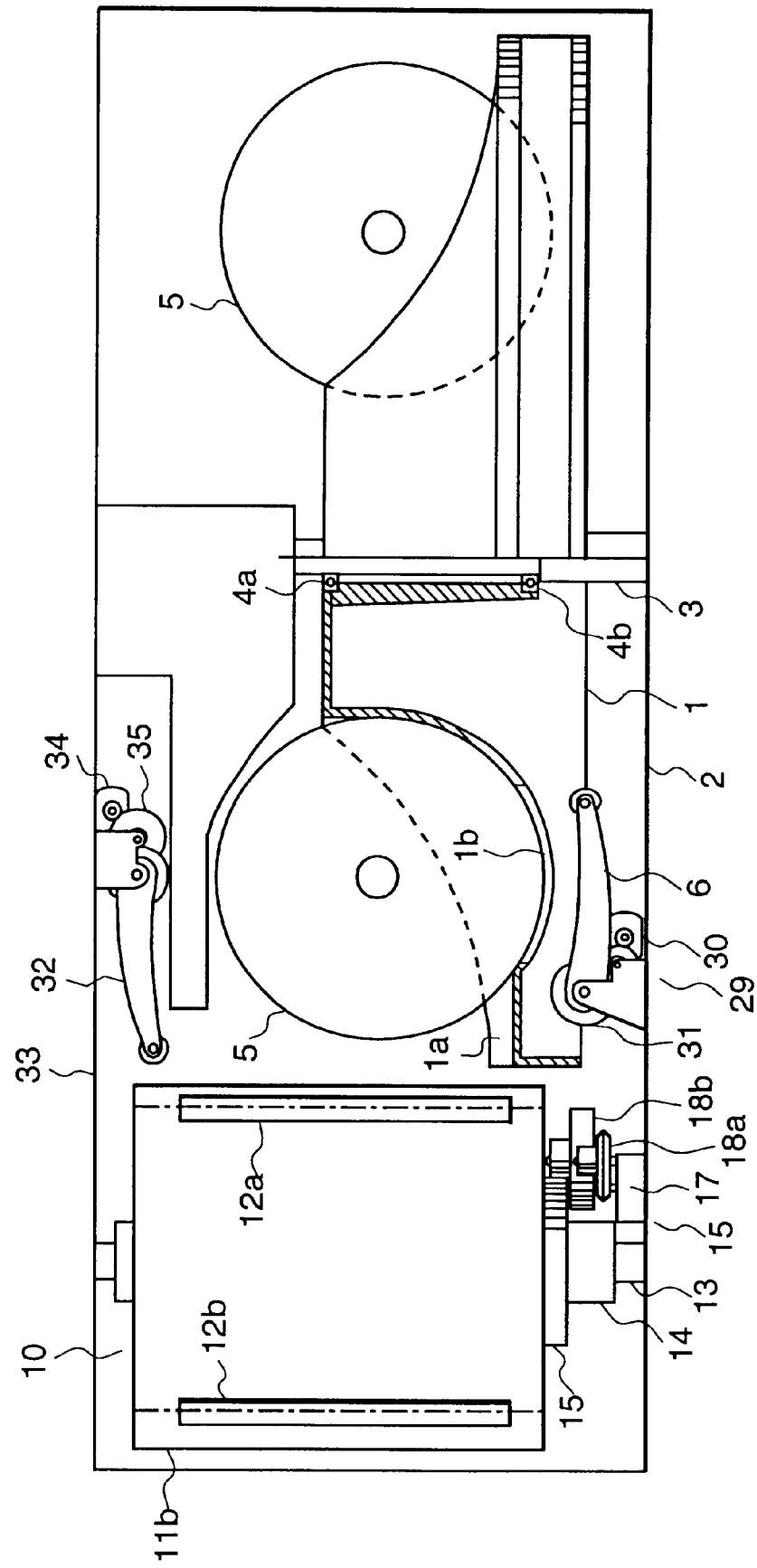
FIG. 2 is a longitudinal sectional view of a disk drive unit which is a preferred embodiment of the present invention.
Figure 3:
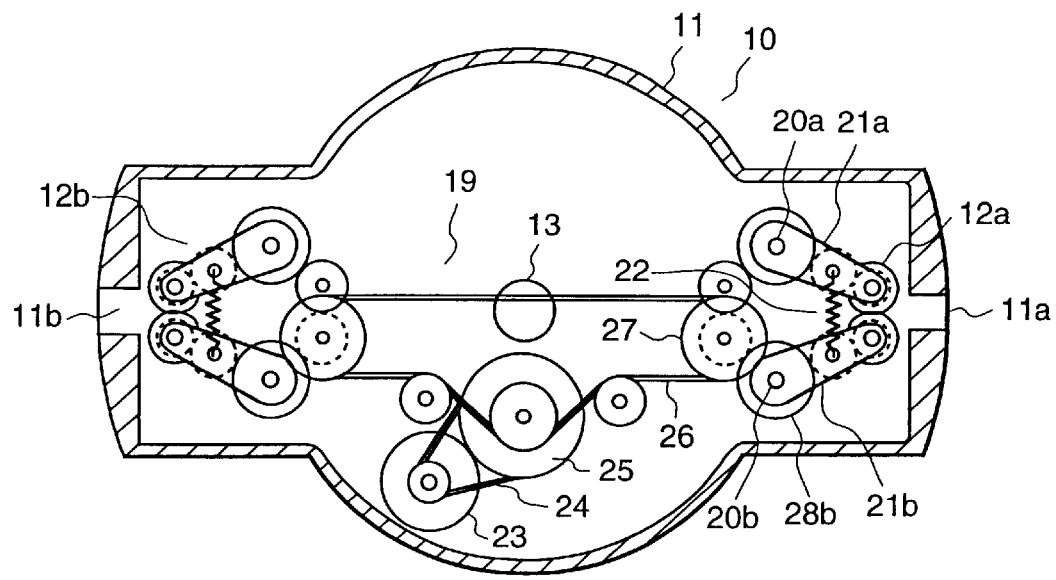
FIG. 3 is a top plan view showing the inside of the access mechanism in a disk drive unit in accordance with the present invention.
Figure 4:
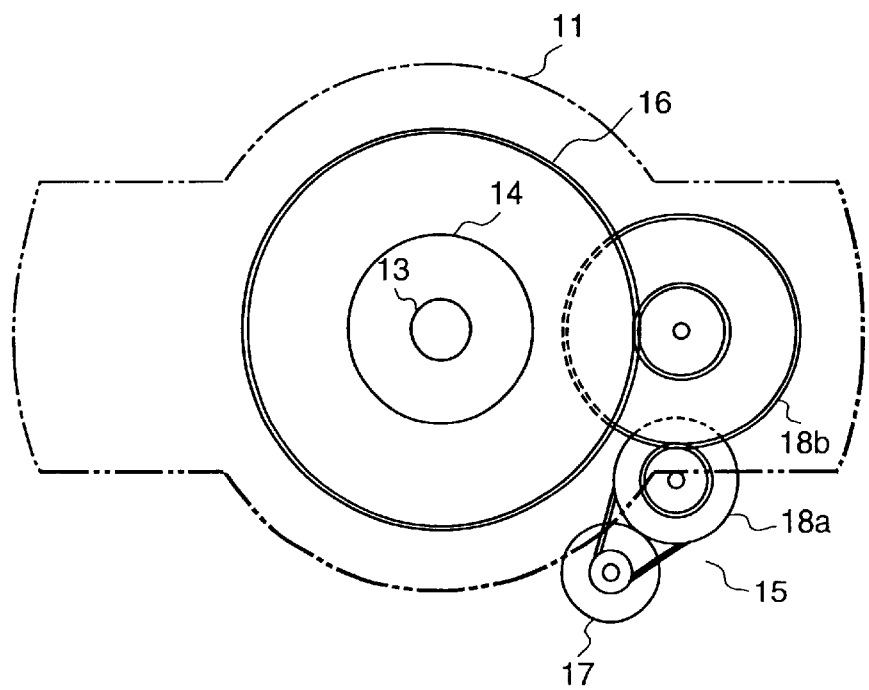
FIG. 4 is a plan view of the access mechanism driving mechanism in a disk drive unit in accordance with the present invention.

Referring to FIG. 1 and FIG. 2 in detail, said rack 1 is pivotally supported by a central shaft 3 which is fixed upright on the bottom chassis 2 by means of bearings 4a and 4b. Said rack 1 has a plurality of disk slits 1a which are radially disposed around said central shaft 3 to hold a plurality of disks 5 on the rack. Said rack 1 has an opening 1b on the bottom of each disk slit 1a for the lower arm 6 to push out a disk 5 from the slit 1a.

A rack driving mechanism 7 consists of a motor 8 and a reduction gear 9 which are fixed to the bottom chassis 2 to turn the rack 1 around the central shaft 3.

Said access mechanism 10 is supported pivotally by a second central shaft 13 which is provided approximately in parallel with the first central shaft 3 and has a disk transfer means (a disk transfer mechanism 19) which selectively faces to said rack 1 and to any of said disk driving mechanisms 37 (37a through 37f) and transfers a disk to and from said rack 1 and said disk driving mechanisms. Said disk driving mechanisms are disposed radially so that they may concentrate to said second central shaft 13 of said access mechanism 10 with a preset distance from the central shaft and each of the disk driving mechanisms may face to said access mechanism.

In other words, referring to FIG. 1 and FIG. 2 in details, the access mechanism 10 contains a mechanism casing 11 having a front slot 11a and a rear slot 11b to let a disk pass through them and a pair of front disk transfer rollers 12a and a pair of rear disk transfer rollers 12b which are respectively provided behind said front slot 11a and said rear slot 11b. The mechanism casing 11 is pivotally supported by a bearing 14 and the central shaft 13 which is fixed upright on the bottom chassis 2 in parallel with said central shaft 3.

Referring to FIG. 1 and FIG. 2 in details, the drive mechanism 15 of the access mechanism 15 consists of a motor 17 and reduction gears 18a and 18b which are fixed on the bottom chassis 2. Said motor and said gears drive a driven gear 16 which is fixed onto the bottom of the access mechanism casing 11 to revolve the access mechanism.

The access mechanism 10 contains a disk transfer mechanism 19 in it. This disk transfer mechanism 19 transfers a disk by a pair of front disk transfer rollers 12a which are placed behind the front slot 11a of the access mechanism casing 19 and a pair of rear disk transfer rollers 12b which are placed behind the rear slot 11b. These pairs of rollers sandwich a disk and revolve to transfer it.

As the disk transfer rollers 12a and 12b are disposed symmetrically like a mirror-image, the driving mechanism of only one roller pair (e.g. 12a) will be explained below. The rollers of the disk transfer roller pair 12a are pivotally mounted on the free ends of two roller arms 21a and 21b pivotally supported by shafts 20a and 20b which are fixed upright on the access mechanism casing 11. The two roller arms 21a and 21b are connected by a spring 22 to get closer to each other and to firmly hold a disk 5 with a force. The rotational force of the motor 23 is transmitted to a reduction pulley 25 by a belt 26 and further to a driven pulley 27 by a belt 27. This driven pulley 27 causes the transmission gears 28a and 28b to revolve said disk transfer rollers 12a.

Figure 5:
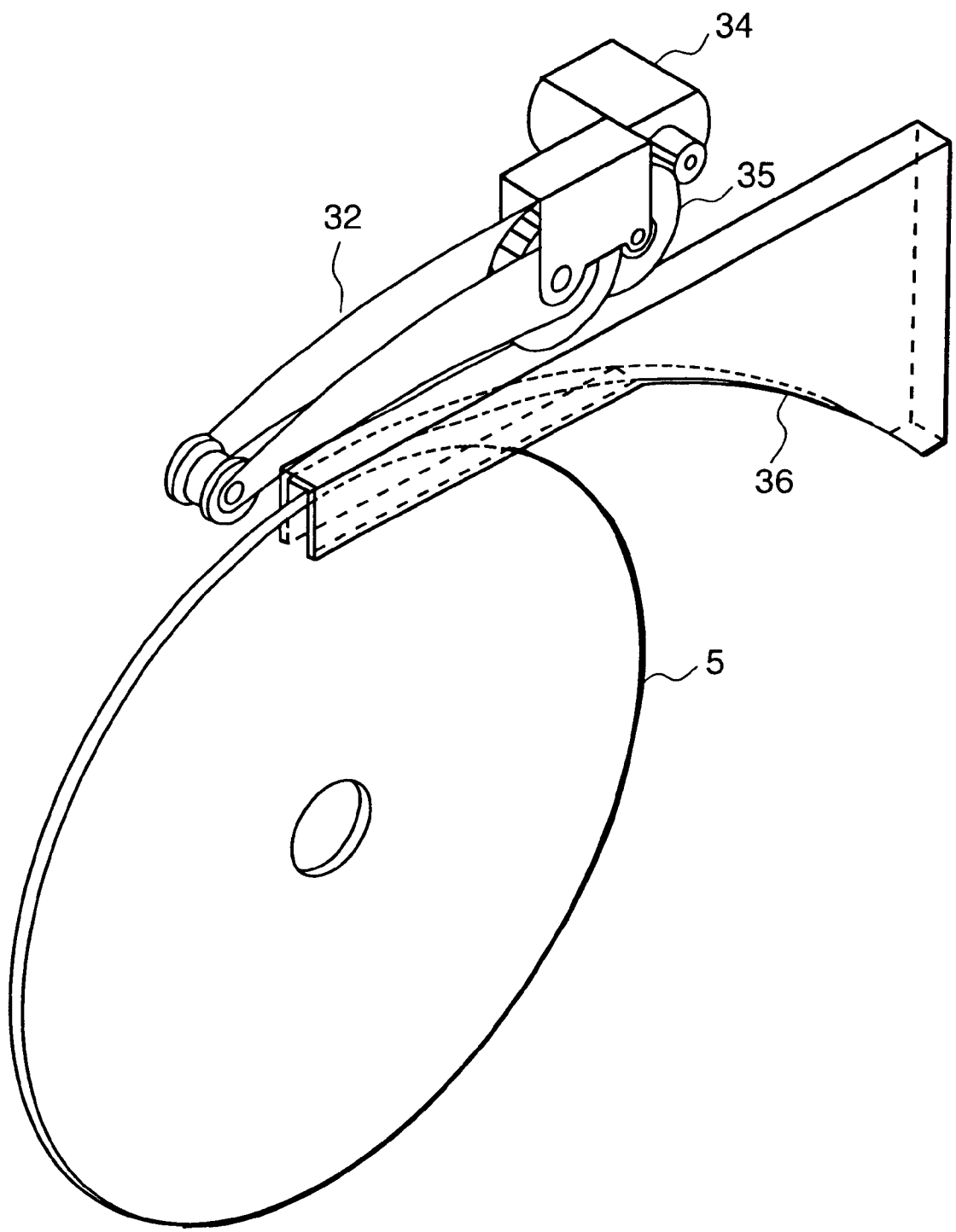
FIG. 5 is a perspective view of an upper arm mechanism in a disk drive unit in accordance with the present invention.

Referring to FIG. 2 in details, the arm mechanism 29 has said lower arm 6 to push up a disk 5 on the rack 1 towards the access mechanism 10. The base of this lower arm 6 is mounted on the bottom chassis 2 under the rack 1 and driven by a lower arm driving mechanism consisting of a motor 30 and a reduction gear 31. As shown in FIG. 2 and FIG. 5, the arm mechanism 29 is equipped with an upper arm 32 which moves up and down to set a disk returned from the access mechanism 10 back into a slit on the rack 1. This upper arm 32 is mounted on the upper chassis above the rack 1 and moved up and down by an upper arm driving mechanism consisting of a motor 34 and a reduction gear 35. Further, a disk guide 36 is mounted on the upper chassis 33 to guide the upper part of a disk 5 which is transferred between the rack 1 and the access mechanism 10.

Referring to FIG. 1 in detail, each of the disk driving mechanisms 37a through 37f has a slot 38 through which a disk is transferred into and from the disk driving mechanism, a roller-driven disk transfer mechanism 39, a turntable 40 for turning a disk, a disk clamping mechanism 41 for chucking a disk, and a read-write head (pickup) unit 42 for reading or writing a disk. The disk driving mechanisms are radially disposed on the bottom chassis 1 around the central shaft 13 of the access mechanism 10 so that they may face to the front slot 11a or the rear slot 11b of the access mechanism casing 11 of said access mechanism 10.

The disk driving mechanisms 37a through 37f are disposed so that each disk driving mechanism may read/write-access side A of the disk 5 when the access mechanism 10 takes in the disk through the front slot 11a from the rack 1 and pushes out the disk to set it in the disk driving mechanism through the same slot 11a or side B of the disk 5 when the access mechanism takes in the disk through the front slot 11a from the rack A and pushes out the disk to set it in the disk driving mechanism through the rear slot 11b.

Similarly each of the disk driving mechanisms 37a through 37f read/write-accesses side A of a disk 5 when the access mechanism 10 takes in the disk 5 through the front slot 11b from the rack 1 and pushes out the disk to set it in the disk driving mechanism through the same slot 11b or side B of the disk 5 when the access mechanism 10 takes in the disk 5 through the rear slot 11b from the rack 1 and pushes out the disk to set it in the disk driving mechanism through the front slot 11a.

Figure 6:
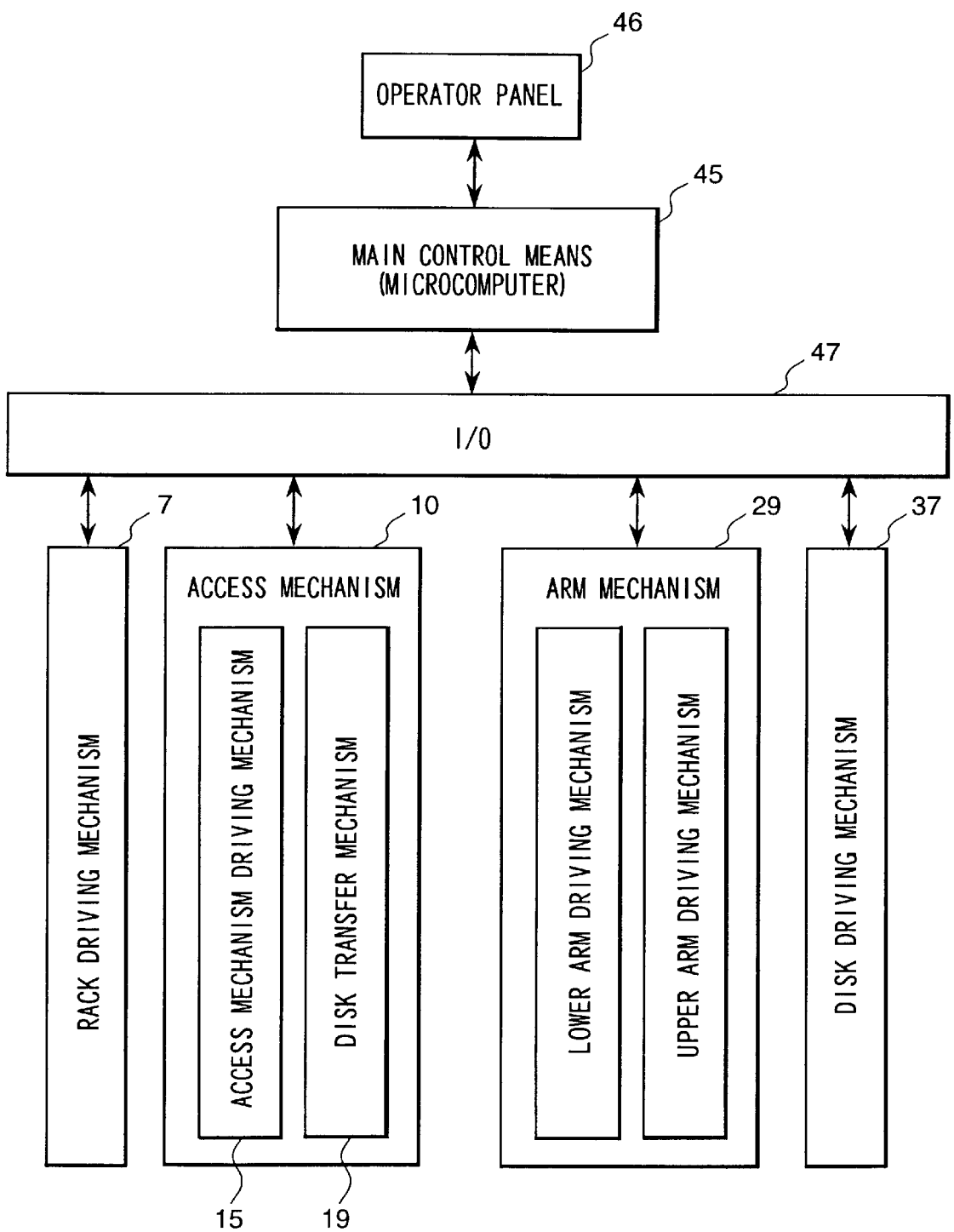
FIG. 6 is a control-related block diagram of a disk drive unit in accordance with the present invention.

FIG. 6 is a control-related block diagram of said disk drive unit. The main control unit 45 consists of a microcomputer and a control processing program. The main control unit 45 fetches detecting signals from sensors (not illustrated in the drawing) through an input-output circuit (I/O) 47 according to disk and access instructions entered from the operator panel 46 and controls the rack driving mechanism 7, the access mechanism driving mechanism 15 and the disk transfer mechanism 19 of the access mechanism 10, the lower arm driving mechanism and the upper arm driving mechanism of the arm mechanism 29, and the disk driving mechanisms 37 by executing the control processing program.

The rack driving mechanism 7 controls the motor 8 to revolve the rack 1 so that a disk slit 1a having a target disk may come to the access position (at which the disk is transferred to the access mechanism 10).

The driving mechanism 15 of the access mechanism 10 controls the motor 17 to revolve the access mechanism casing 11 so that the front slot 11a or the rear slot 11b of the access mechanism may face to the access position (at which the access mechanism transfers a disk to and from the rack 1) or to a disk transfer position of a selected disk driving mechanism 47a through 47f (at which the access mechanism transfers a disk to and from the disk driving mechanism).

The disk transfer mechanism 19 controls the motor to revolve the disk transfer rollers 12a and 12b to transfer a disk between the disk transfer mechanism and the rack 1 or the disk driving mechanism 47a to 47f.

The arm mechanism 29 controls the motor 30 in the lower arm driving mechanism to move up the lower arm 6 to push up a disk 5 from the slit 1a on the rack 1 into the access mechanism 10 when transferring the disk 5 from rack 1 to the access mechanism 10 or controls the motor 34 in the upper arm driving mechanism to move down the upper arm 32 to take in a disk 5 from the access mechanism 10 into the slit 1a on the rack 1 when transferring the disk 5 from the access mechanism 10 to the rack 1.

Each disk driving mechanism 37a through 37f controls the disk transfer mechanism 39, the turntable 40, the clamp mechanism 41, and the read/write head 42 to hold or release a disk and read or write the disk.

Referring to FIG. 1 and FIG. 6 through FIG. 12, below will be explained how the main control unit 45 of the disk drive unit of the present invention works to change disks and read/write-accesses a disk.

Figure 7:
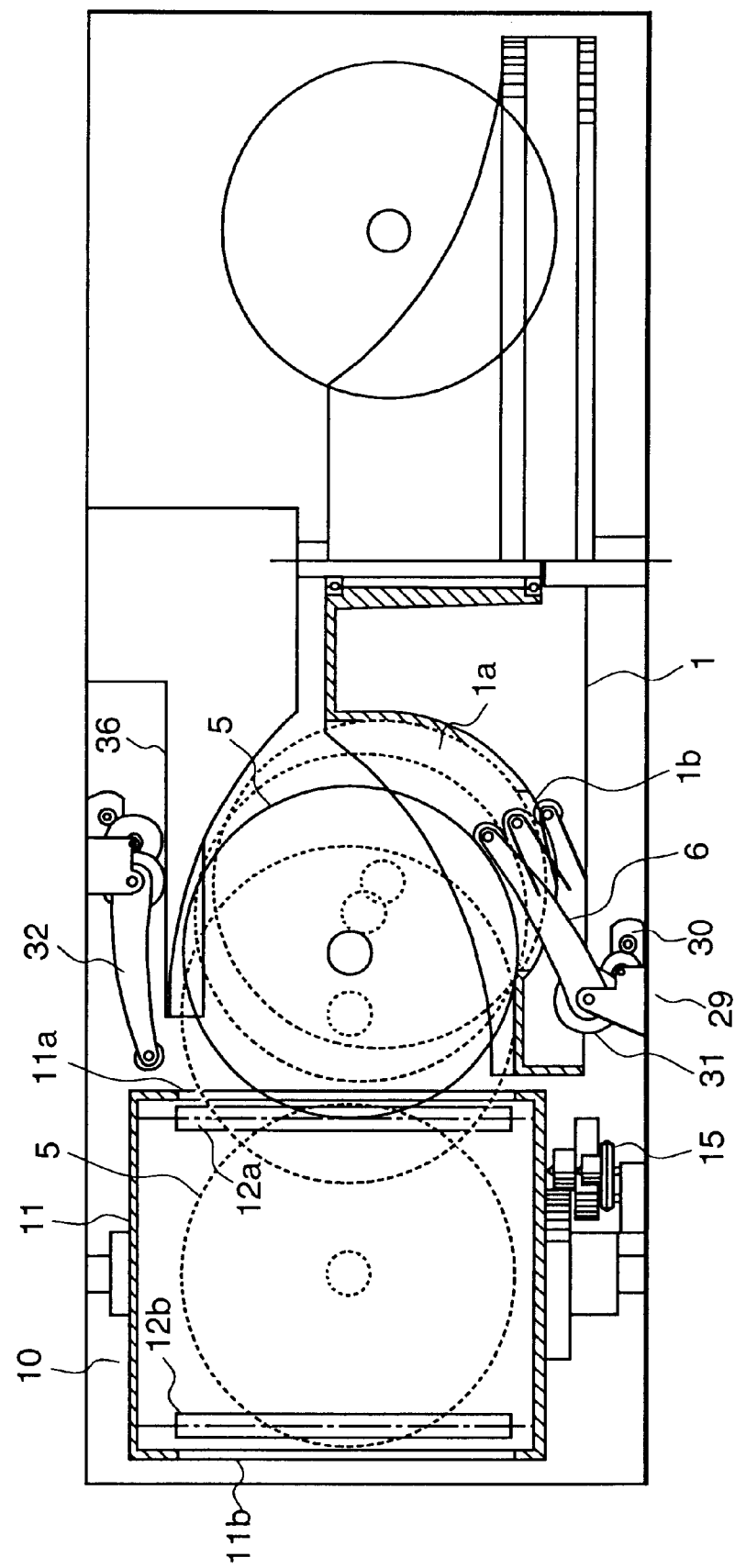
FIG. 7 is a longitudinal sectional view of a disk drive unit which is a preferred embodiment of the present invention, showing how a disk is moved from the rack to the access mechanism.

First the treatment of a single-sided disk (Side A only) will be explained below. When the operator selects a target disk 5 and types its address number on the operator panel 46, the main control unit 45 controls the motor 8 of the rack driving mechanism 7 to revolve the rack 1 so that the slit 1a having the target disk 5 may come to face to the front slot 11a of the access mechanism 10. (See FIG. 1.) Next, the main control unit 45 controls the motor 30 in the lower arm driving mechanism of the arm mechanism 29 to move up the lower arm 6 (as illustrated in FIG. 7) to push up a disk 5 from the slit 1a on the rack 1 through the opening 1b of the rack 1.

With this, the disk 5 goes into the front slot 11a of the access mechanism 10, opens the roller arms 21a and 21b (having a pair of disk transfer rollers 12a) of the access mechanism 10, and is held by the disk transfer rollers 12a. In synchronism with this, the disk transfer mechanism 19 revolves the disk transfer rollers 12a and 12b to take the disk 5 into the access mechanism 10, then stops when the disk is fully in the access mechanism 10.

Figure 8:
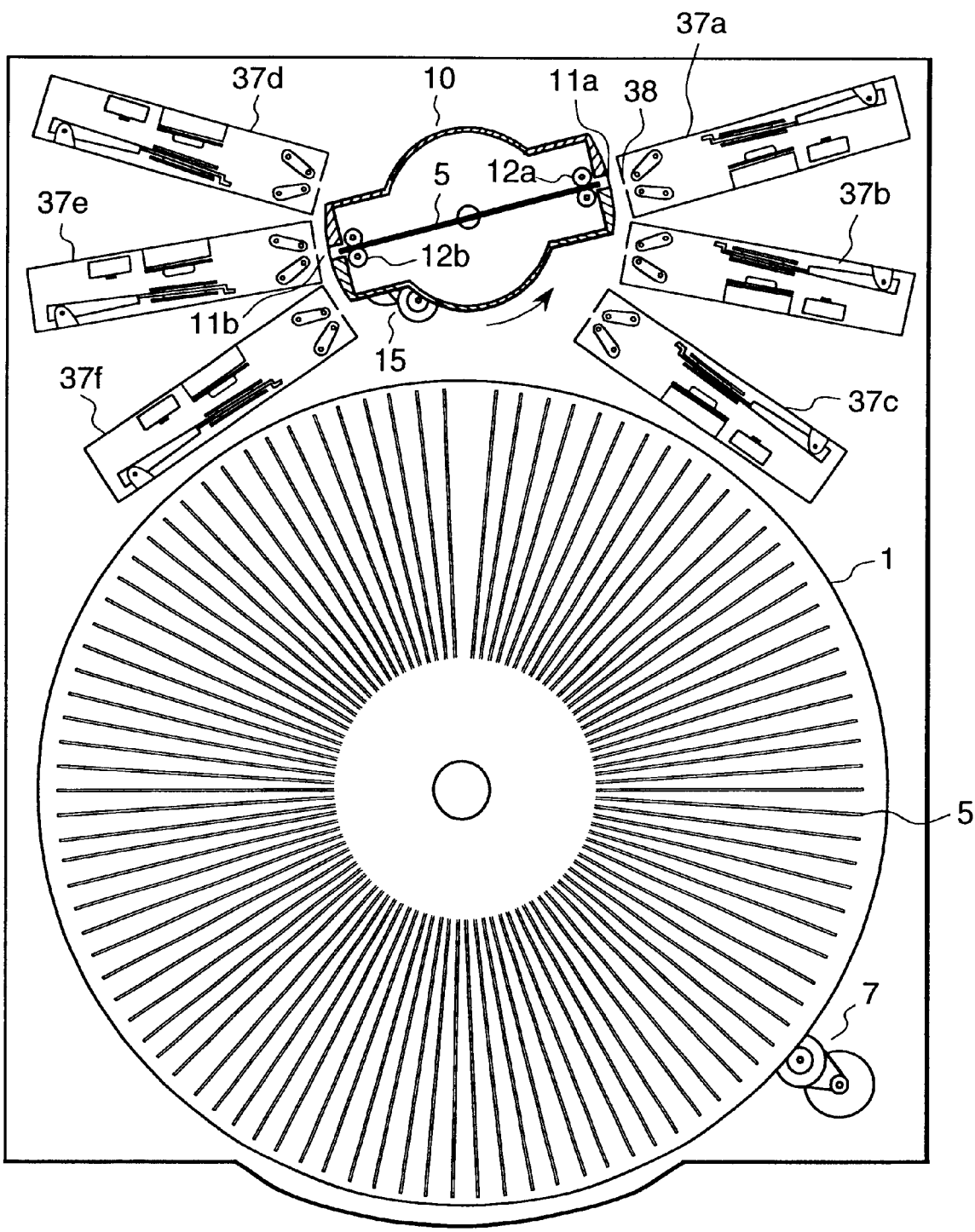
FIG. 8 is a top plan view of a disk drive unit in accordance with the present invention, showing how the access mechanism transfers a disk to a selected disk drive mechanism.

Then the main control unit 45 controls the driving mechanism 15 of the access mechanism 10 to revolve the access mechanism 10 in the arrow direction (as illustrated in FIG. 8) so that the front slot 11a of the access mechanism 10 may face to the slot 38 of a selected disk driving mechanism 37a.

Figure 9A:
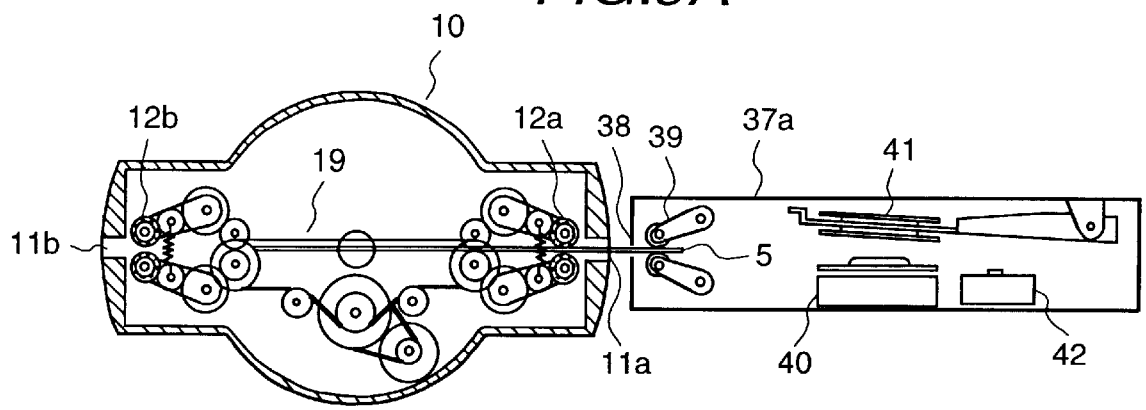
FIGS. 9A, 9B and 9C are three top plan views of an access mechanism and a selected disk driving mechanism in a disk drive unit in accordance with the present invention, showing how the access mechanism transfers a disk to the selected disk drive mechanism.

Referring to FIG. 9(A), the main control unit 45 controls the disk transfer mechanism 19 to revolve the disk transfer rollers 12a and 12b to roll out the disk 5 into the disk driving mechanism 37a. The disk is inserted into the disk transfer mechanism 39 through the slot 38 of said disk driving mechanism 37a.

Figure 9B:
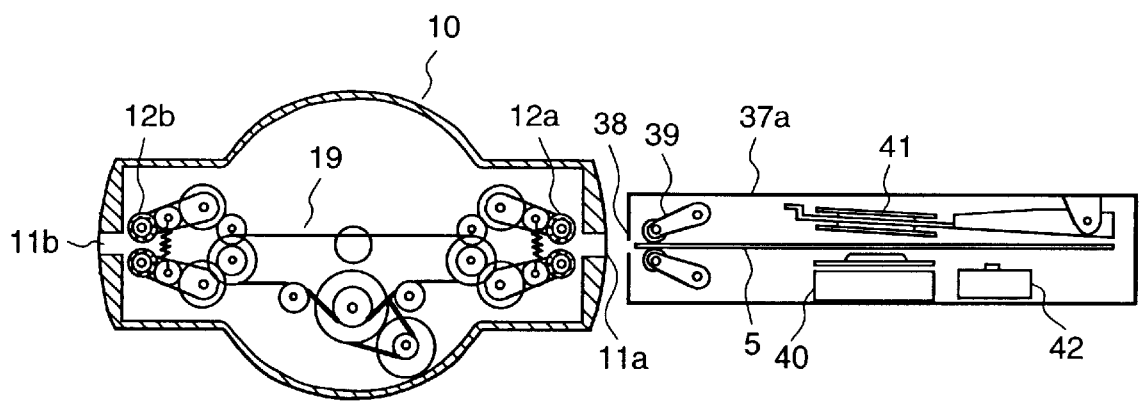
Figure 9C:
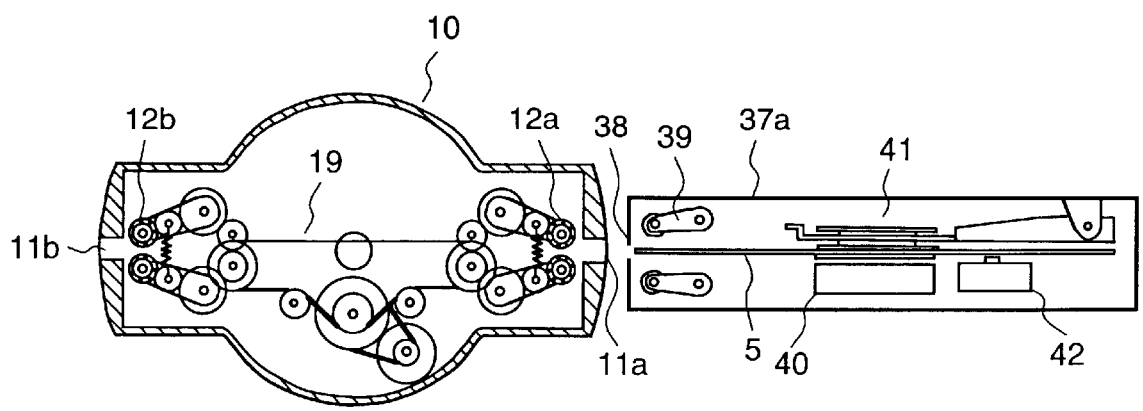

In synchronism with this, the main control unit 45 drives the disk transfer mechanism 39 of the disk driving mechanism 37a. As illustrated in FIG. 9(B), the disk 5 is taken into the disk driving mechanism 37a until the center of the disk matches the spindle of the turntable 40, then the disk is clamped to the turntable 40 by the clamp mechanism 41. At the same time, the disk transfer mechanism 39 opens to release the disk.

The disk driving mechanism drives the turntable 40 to rotate the disk 5 and drives the read/write head 42 to read and write the disk.

The above operations are reversed to return the accessed disk 5 to the preset disk slit 1a of the rack 1. In this case, the upper arm 32 of the arm mechanism 29 is moved down to set the disk back to the slit 1a of the rack 1.

Figure 10A:
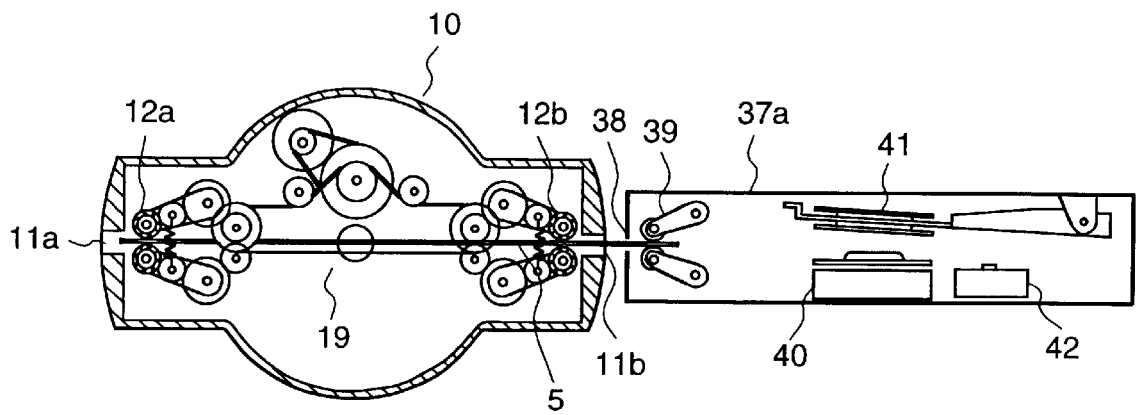
FIGS. 10A and 10B are two top plan views of an access mechanism and two selected disk driving mechanisms in a disk drive unit in accordance with the present invention, showing how both sides of a disk is read-or write-accessed by the two disk driving mechanism.
Figure 10B:
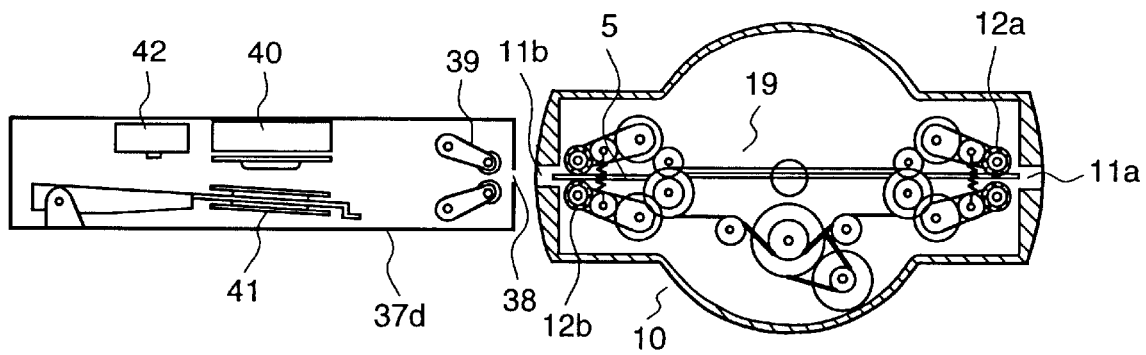

To read/write-access side B of a double-sided disk, the main control unit 45 causes the access mechanism to revolve to face the rear slot 11b of the access mechanism 10 to the disk drive mechanism 37a and to push the disk 5 into the disk drive mechanism 37a as illustrated in FIG. 10(A) or causes the access mechanism to revolve to face the rear slot 11b of the access mechanism 10 to the disk drive mechanism 37d and to push the disk 5 into the disk drive mechanism 37d as illustrated in FIG. 10(B). With this, side B of the disk 5 is set on the turntable 40 and read/write-accessed by the read/write head.

Figure 11A:
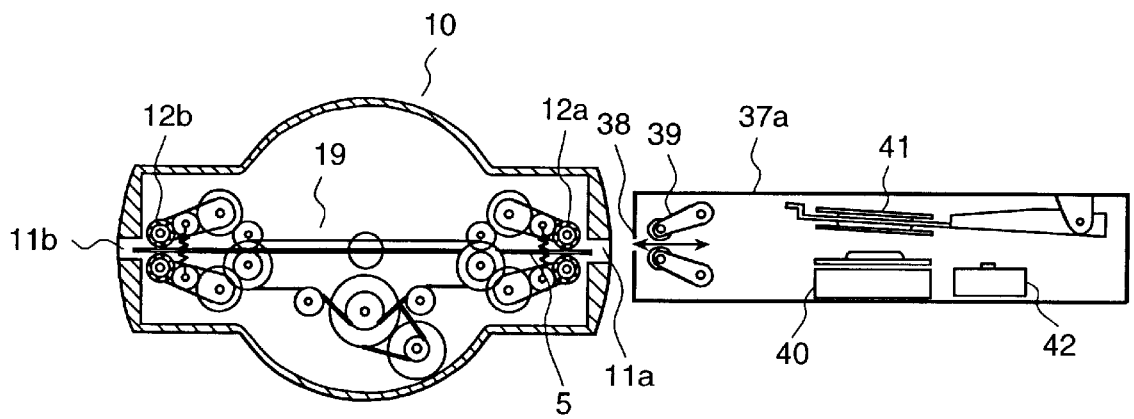
FIGS. 11A and 11B are two top plan views of an access mechanism and a selected disk driving mechanism in a disk drive unit in accordance with the present invention, showing how both sides of a disk is read-or write-accessed by the single disk driving mechanism.
Figure 11B:
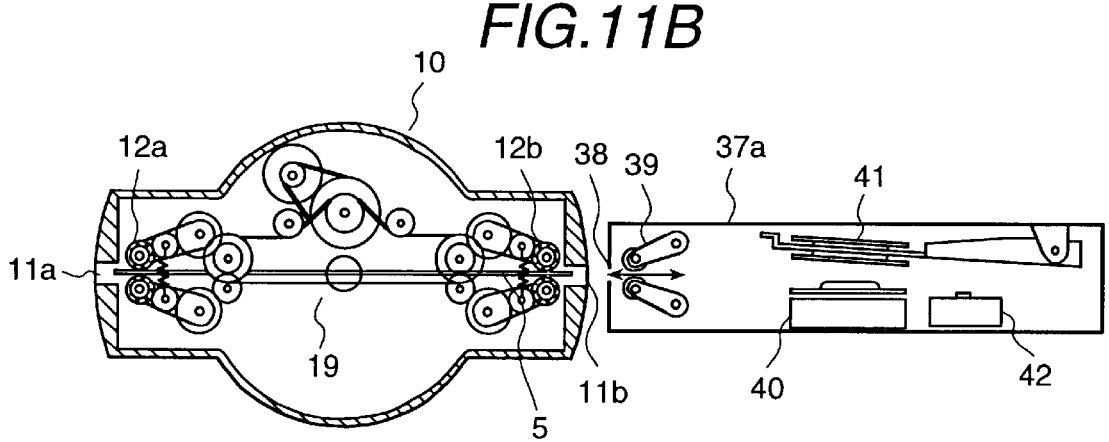
Figure 12:
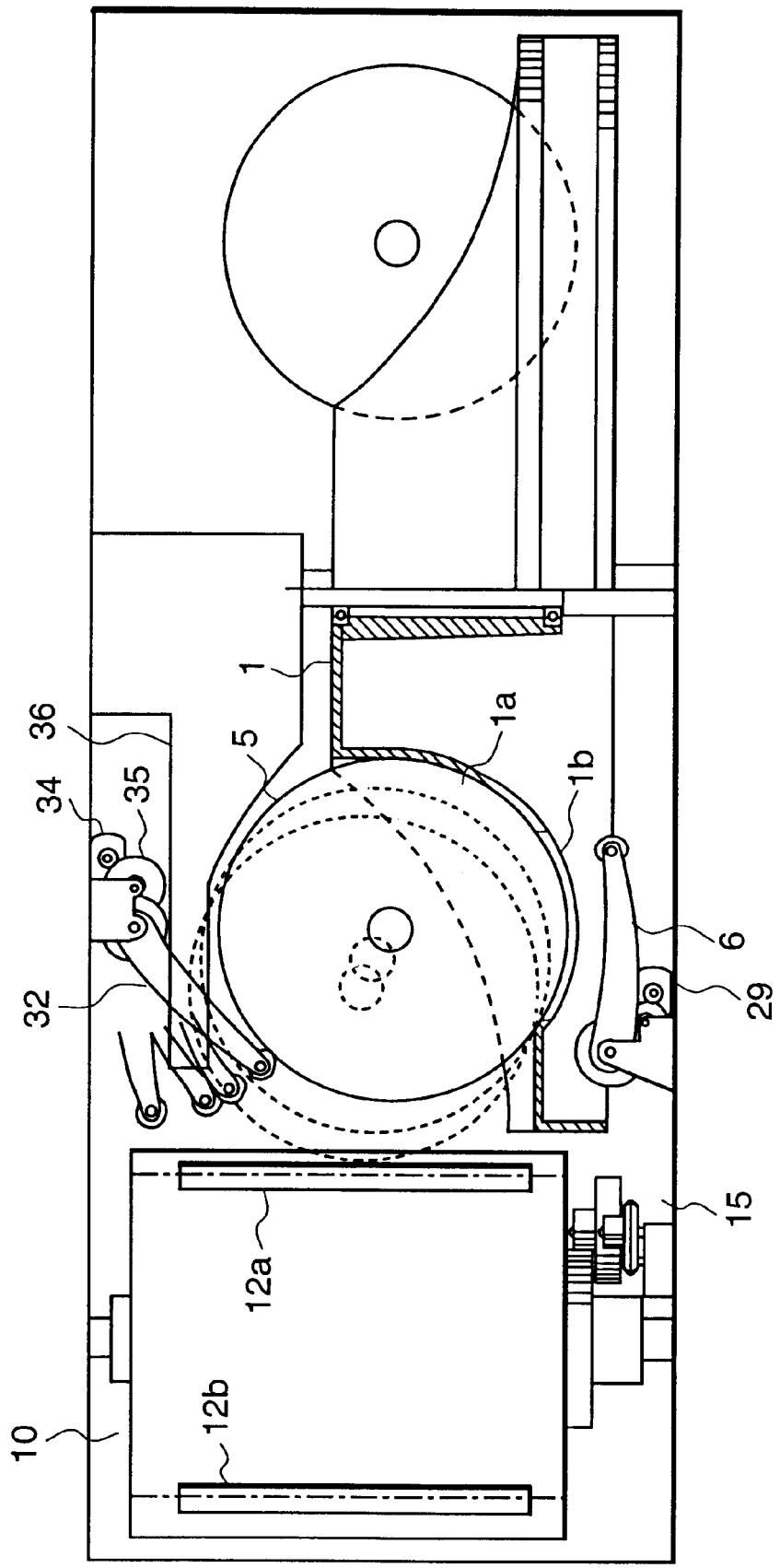
FIG. 12 is a longitudinal sectional view of a disk drive unit which is a preferred embodiment of the present invention, showing how a disk is moved from the access mechanism to the rack.
Figure 13:
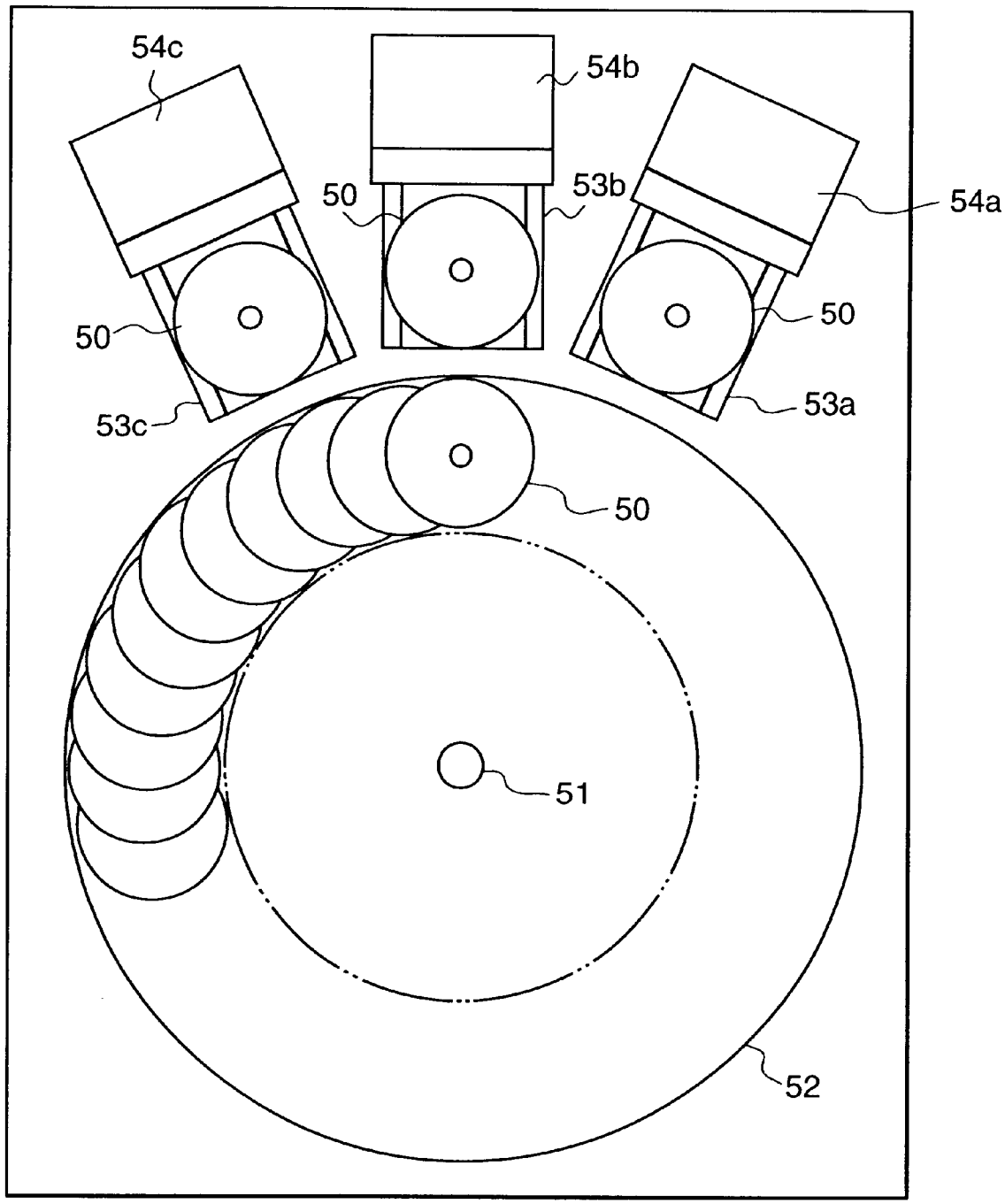
FIG. 13 is a top plan view showing the layout of components of a disk drive unit which is an embodiment of a conventional invention.
Figure 14:
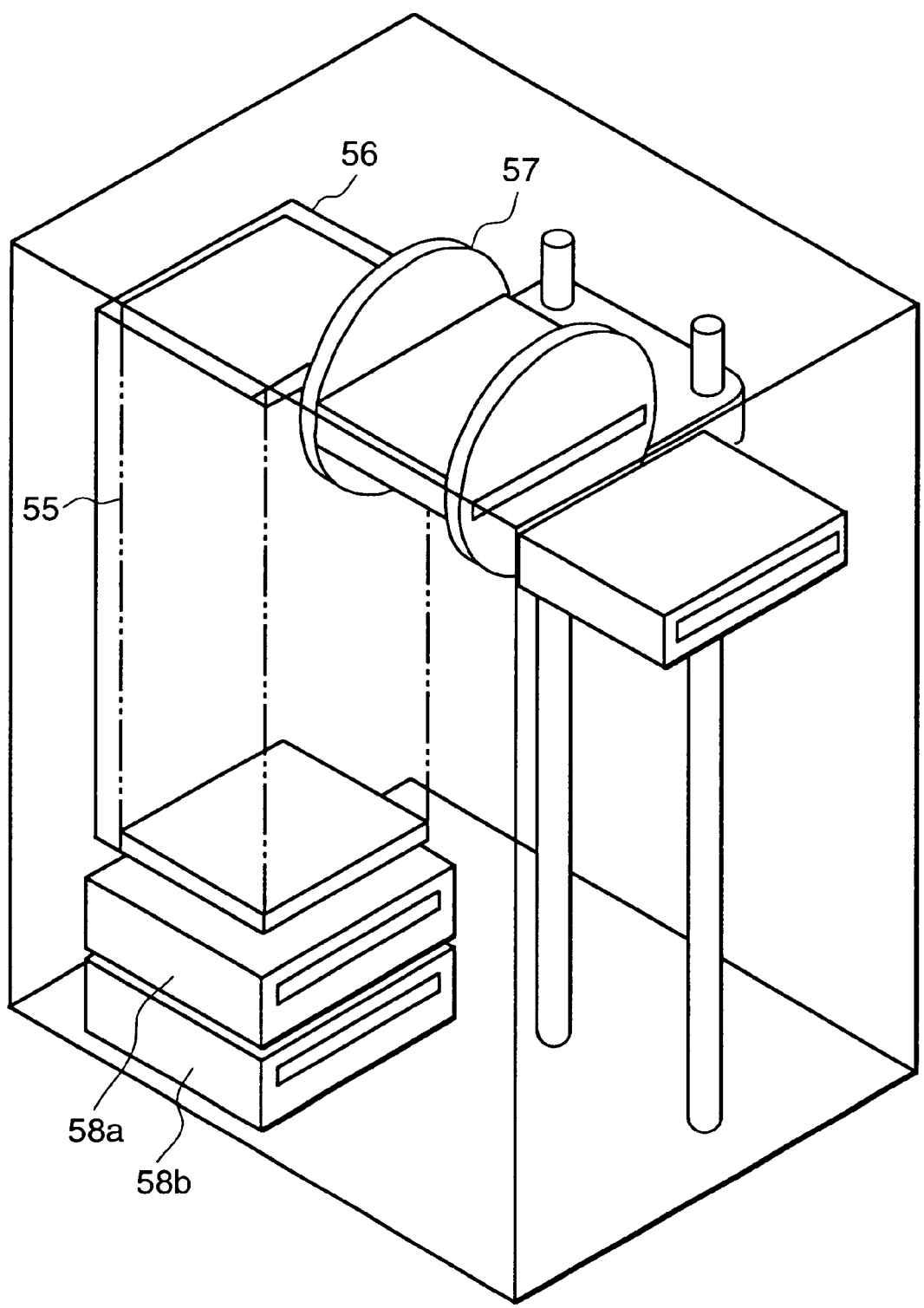
FIG. 14 is a top plan view showing the layout of components of a disk drive unit which is another embodiment of a conventional invention.

To cause the disk driving mechanism 37a to read or write the other side (Side B) of the disk after reading or writing one side (Side A) of the disk by the disk driving mechanism 37a, the disk driving mechanism 37a sends back the disk to the access mechanism 10 after reading or writing side A of the disk, as illustrated in FIG. 11(A). The main control unit 45 causes the access mechanism 10 to revolve 180 degrees (as illustrated in FIG. 11(B)) to face the rear slot 11b of the access mechanism 10 to the disk driving mechanisms 37a and to insert the disk 5 again into the disk driving mechanism 37a. Thus, the disk 5 is set on the turntable 40 with its side B faced to the read/write head 42 and the side B is read or written.

As above-explained, the disk change to read/write both sides of a disk is easily accomplished by the revolution of the access mechanism 10.

There is another way to read or write the other side (Side B) of the disk after reading or writing one side (Side A) of the disk by a disk driving mechanism. Although this way is not illustrated herein, it comprises inserting a disk 5 into a disk driving mechanism 37a through the front slot 11a of the access mechanism 10, read/write-accessing one side (Side A) of the disk on the disk driving mechanism 37a, returning the disk 5 back into the access mechanism 10 through the front slot 11a, revolving the access mechanism 10 so that the rear slot 11b of the access mechanism 10 may face to the nearest disk driving mechanism 37f, inserting the disk into the disk driving mechanism 37f through the rear slot 11b of the access mechanism 10, and causing the disk driving mechanism 37f to read/write the other side (Side B) of the disk 5. This disk changing way is the fastest as the access mechanism 10 revolves least.

The disk change time can be reduced greatly when one group of disk driving mechanisms 37a through 37c and another group of disk driving mechanisms 37d through 37f which are disposed around the central shaft 13 of the access mechanism 10 are diametrically opposite to each other because, in this arrangement of disk driving mechanisms, the access mechanism need not revolve to the nearest disk driving mechanism.

This disk drive unit can also work as a read-only or write-only disk drive unit.

As described above, according to present invention, the access mechanism for transferring a disk between the rack and a plurality of disk driving mechanisms is pivotally supported by a central shaft which is approximately in parallel with the central shaft of the rack. A disk transfer means is provided to selectively face to said rack and to any of said disk driving mechanisms to transfer a disk between them. Said plurality of disk driving mechanisms are radially disposed around the central shaft of said access mechanism to face to the revolving access mechanism at a preset distance. Said access mechanism is made to fetch a disk from the rack, revolve to face to a selected disk driving mechanism, and to transfer the disk to and from the selected disk driving mechanism. These features make the disk drive unit smaller and disk changing on a plurality of disk driving mechanisms faster.

What is claimed is:

1. A disk drive unit comprising a rack which revolves on a first central shaft with a plurality of disks arranged on said rack radially around the central shaft, a plurality of disk driving mechanisms each of which read-accesses or read/write-accesses a disk, an access mechanism which is located between said rack and said disk driving mechanisms to transfer said disks between said rack and said disk driving mechanisms, and a control unit; wherein said access mechanism is pivotally supported by a second central shaft which is approximately in parallel with said first central shaft and equipped with a disk transfer means which can selectively face said rack and any of said disk driving mechanisms, and wherein said disk driving mechanisms are disposed radially around said second central shaft to face the revolving access mechanism at a preset distance; and wherein said disk transfer means comprises a first disk transport and a second disk transport such that said disk transfer means takes a disk from the rack using said first disk transport and moves said disk to any one of said disk driving mechanisms using said second disk transport.

2. A disk drive unit according to claim 1 wherein said disk transfer means further takes a disk from the rack and moves said disk to any one of said disk driving mechanisms using only one of said first and second disk transports.

3. A disk drive unit comprising a rack which revolves on a first central shaft with a plurality of disks arranged on said rack radially around the central shaft, a plurality of disk driving mechanisms each of which read-accesses or read/write-accesses a disk, an access mechanism which is located between said rack and said disk driving mechanisms to transfer said disks between said rack and said disk driving mechanisms, and a control unit; wherein said access mechanism is pivotally supported by a second central shaft which is approximately in parallel with said first central shaft and equipped with a disk transfer means which can selectively face said rack and any of said disk driving mechanisms, and wherein said disk driving mechanisms are disposed radially around said second central shaft to face the revolving access mechanism at a preset distance; and wherein said disk transfer means comprises a first disk transport and a second disk transport such that said disk transfer means receives a disk from any one of said disk driving mechanisms using said first disk transport and delivers said disk to said one of said disk driving mechanisms using said second disk transport.

4. A disk drive unit according to claim 3 wherein said disk transfer means further takes a disk from the rack and moves said disk to any one of said disk driving mechanisms using only one of said first and second disk transports.

5. A disk drive unit comprising a rack which revolves on a first central shaft with a plurality of disks arranged on said rack radially around the central shaft, a plurality of disk driving mechanisms each of which read-accesses or read/write-accesses a disk, an access mechanism which is located between said rack and said disk driving mechanisms to transfer said disks between said rack and said disk driving mechanisms, and a control unit; wherein said access mechanism is pivotally supported by a second central shaft which is approximately in parallel with said first central shaft and equipped with a disk transfer means which can selectively face said rack and any of said disk driving mechanisms, and wherein said disk driving mechanisms are disposed radially around said second central shaft to face the revolving access mechanism at a preset distance; and wherein said disk transfer means comprises a first disk transport and a second disk transport such that said disk transfer means receives a disk from any one of said disk driving mechanisms using said first disk transport and delivers said disk to a different one of said disk driving mechanisms using said second disk transport.

6. A disk drive unit according to claim 5 wherein said disk transfer means further takes a disk from the rack and moves said disk to any one of said disk driving mechanisms using only one of said first and second disk transports.

* * * * *